(12) United States Patent
Karogal et al.

(10) Patent No.: US 12,503,098 B2
(45) Date of Patent: Dec. 23, 2025

(54) HYBRID VEHICLE ENGINE START USING CLUTCHES OF DUAL CLUTCH TRANSMISSION

(71) Applicant: FCA US LLC, Auburn Hills, MI (US)

(72) Inventors: Indrasen Karogal, Auburn Hills, MI (US); Zachary L Tuller, Grand Rapids, MI (US); Nadirsh Patel, Farmington Hills, MI (US); Dario Morina, Turin (IT); Alessandro Lelli, Turin (IT); Giuseppe Corallo, Turin (IT); Pier Luca Di Gristina, Turin (IT); Paolo Olivieri, Pecello Torinese (IT); Gaurav S Sadekar, Rochester Hills, MI (US); Federico de Bosio, Turin (IT); Allwyn Bhakare, Windsor (CA); Naresh Sathyamoorthy, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 58 days.

(21) Appl. No.: 18/432,734

(22) Filed: Feb. 5, 2024

(65) Prior Publication Data
US 2024/0262343 A1   Aug. 8, 2024

Related U.S. Application Data

(60) Provisional application No. 63/483,564, filed on Feb. 7, 2023.

(51) Int. Cl.
 *B60W 20/40*  (2016.01)
 *B60W 10/02*  (2006.01)
 (Continued)

(52) U.S. Cl.
 CPC ............ *B60W 20/40* (2013.01); *B60W 10/02* (2013.01); *B60W 10/08* (2013.01); *B60W 10/10* (2013.01);
 (Continued)

(58) Field of Classification Search
 CPC ...... B60W 10/02; B60W 10/08; B60W 10/10; B60W 10/113; B60W 20/40; B60W 20/15;
 (Continued)

(56) References Cited

U.S. PATENT DOCUMENTS

| | | | |
|---|---|---|---|
| 9,022,897 B2 * | 5/2015 | Maass | B60W 10/113 477/5 |
| 2005/0139035 A1 * | 6/2005 | Lee | B60W 10/113 74/661 |

(Continued)

OTHER PUBLICATIONS

WO2021228665A1 and English translation; Ott et al.; Nov. 18, 2021 (Year: 2025).*

*Primary Examiner* — Roger L Pang
(74) *Attorney, Agent, or Firm* — Jeremy J. Klobucar

(57) ABSTRACT

A hybrid electric vehicle includes: a dual clutch transmission having first and second sub-transmissions having respective first and second clutches and first and second synchronizers, and an electric motor rotationally coupled to the second sub-transmission for common rotation therewith; and a control system including a hybrid controller and a transmission controller with the HCP being a supervisory controller, wherein the control system is configured to execute an engine clutch start procedure using the electric motor, and wherein the procedure eliminates hard vehicle speed limits, provides smooth wheel torque during the procedure, and increases a number of transmission gears available for the procedure.

11 Claims, 7 Drawing Sheets

(51) Int. Cl.
*B60W 10/08* (2006.01)
*B60W 10/10* (2012.01)
*B60W 20/10* (2016.01)
*B60W 20/15* (2016.01)
*F02N 11/08* (2006.01)

(52) U.S. Cl.
CPC ............ *B60W 20/10* (2013.01); *B60W 20/15* (2016.01); *F02N 11/0851* (2013.01); *B60W 2540/10* (2013.01); *B60W 2710/021* (2013.01); *B60W 2710/083* (2013.01); *B60W 2710/1005* (2013.01)

(58) Field of Classification Search
CPC .. B60W 20/10; B60W 20/30; B60W 2540/10; B60W 2710/083; B60W 2710/1005; B60W 2710/021
USPC ........................................................ 477/5, 15
See application file for complete search history.

(56) References Cited

U.S. PATENT DOCUMENTS

2018/0244262 A1* 8/2018 Ruybal ................ B60W 10/113
2020/0148194 A1* 5/2020 Hoess ................... B60K 6/547

* cited by examiner

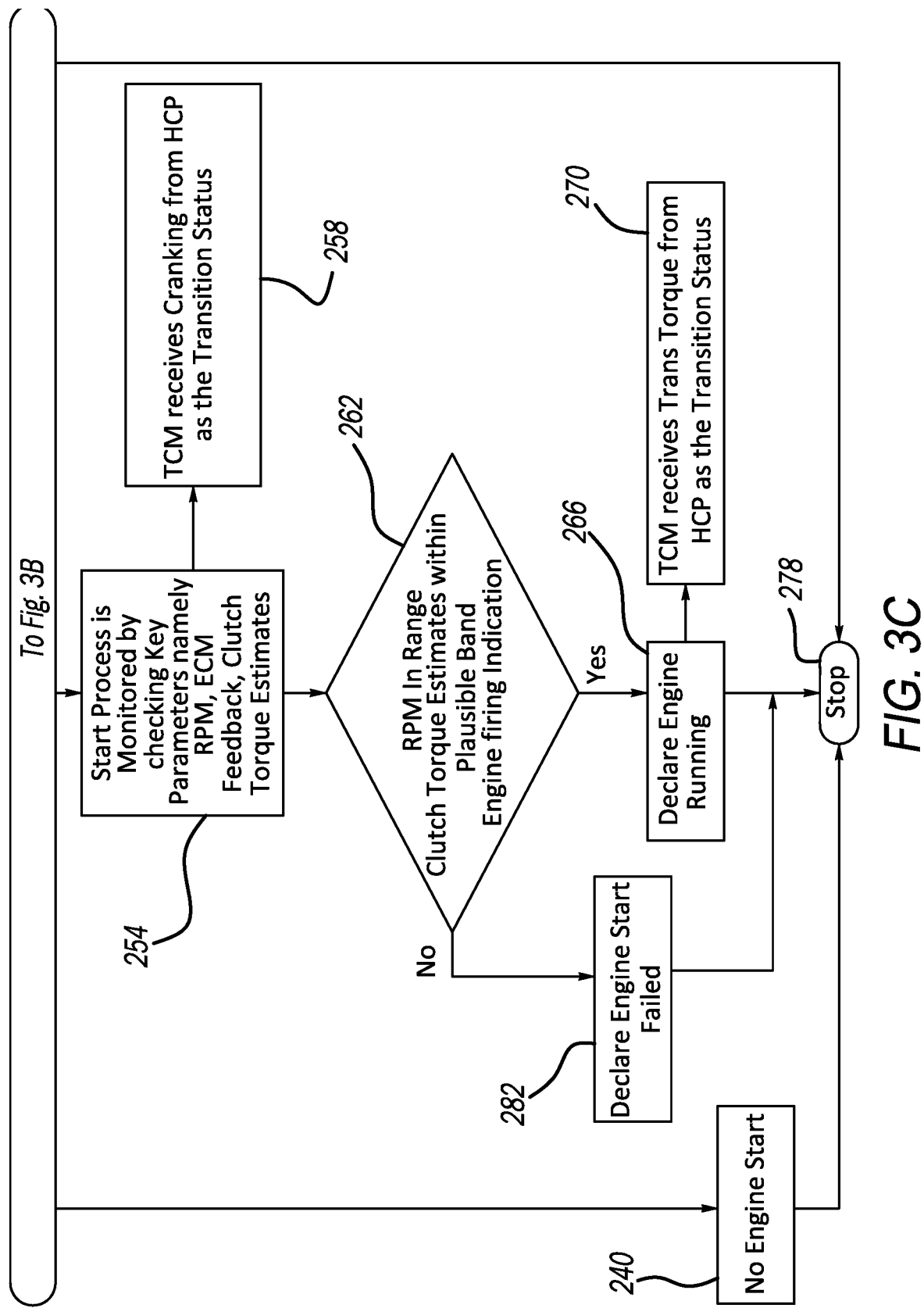

HYBRID VEHICLE ENGINE START USING CLUTCHES OF DUAL CLUTCH TRANSMISSION

CROSS-REFERENCE TO RELATED APPLICATION(S)

The present application claims the benefit of U.S. Provisional Application No. 63/483,564, filed on Feb. 7, 2023. The disclosure of this application is incorporated herein by reference in its entirety.

FIELD

The present application generally relates to hybrid electric vehicles and, more particularly, to systems, methods and techniques for engine start using clutches of a dual clutch transmission in a hybrid electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There are several traditional engine start types possible for existing powertrain architecture in hybrid electric vehicles, such as P1f based starts, 12V Pinion start, etc. Each of these start types, however, have limitations due to system constraints, hardware limitations, cost limitations and boundary conditions for the execution of successful starts over a lifetime of the hybrid vehicle. Additionally, in certain limp-home conditions of the hybrid vehicle, such as possible motor or battery faults, the traditional above start types could become inoperative or not possible to execute. For example, at high speeds, a P1f motor becoming inoperable could abort a P1f start and could lead to a possible engine shutdown and a potential for the vehicle to become inoperable or have limited drivability.

In a hybrid electric vehicle that is a mild hybrid electric vehicle (MHEV) utilizing a dual clutch transmission, there are additional start types available such as electric motor start and impulse start. However, in mild hybrid electric vehicles with dual clutch transmissions, the electric motor starts can only be done in Park or Neutral gear states and the impulse starts are restricted to a time when even gear shifts occur. The bump starts in PHEV programs have hard restrictions on vehicle speed, transmission gears, and system state(s) due to vehicle safety and vehicle control maneuvers considerations, etc. Accordingly, while such conventional engine start techniques do work for their intended purpose, there exists an opportunity for improvement in the relevant art.

SUMMARY

According to one example aspect of the invention, a hybrid electric vehicle is provided. In one exemplary implementation, the hybrid vehicle includes: a dual clutch transmission having first and second sub-transmissions having respective first and second clutches and first and second synchronizers, and an electric motor rotationally coupled to the second sub-transmission for common rotation therewith; a control system including at least a hybrid control unit (HCP) and a transmission control unit (TCM), wherein the HCP functions as a supervisory controller, and wherein the control system is configured to execute an engine clutch start procedure, including: with the vehicle in an electric only propulsion mode where the second clutch is disengaged and the electric motor provides propulsive torque to a driveline of the vehicle via the second sub-transmission, determining that a driver torque request received is greater than a maximum torque of the electric motor minus a torque reserve of the electric motor; the HCP coordinating with the TCM to determine an engine start torque required to start the engine, and determining the electric motor torque reserve is greater than the engine start torque required to start the engine; the HCP coordinating with the TCM via shift-type signals to establish an engine start gear of the first sub-transmission, and a target gear to be engaged after the engine is started; the TCM applying the first clutch thereby coupling the engine with the first sub-transmission with the engine start gear engaged; the HCP coordinating with the TCM to control the electric motor to provide torque to crank the engine to a threshold rotating speed sufficient for starting the engine and thereafter coordinating starting of the engine; and the TCM coordinating control of the first and second clutches for shifting from the engine start gear to the target gear, wherein propulsive torque is then provided by the engine and the electric motor through the target gear of second sub-transmission.

In some implementations, after the TCM applies the first clutch, the HCP coordinates with the TCM to command additional torque from the electric motor to compensate for torque loss from engagement of the first clutch.

In some implementations, the HCP coordinating with the TCM via shift-type signals incudes the HCP informing the TCM of the upcoming clutch start and the TCM confirming the upcoming clutch start by responding with shift-type signals specifying the engine start gear and the target gear.

In some implementations, the TCM responds with shift-type signals specifying the currently engaged gear of the second sub-transmission.

In some implementations, the HCP coordinating with the TCM to control the electric motor to provide torque to crank the engine includes providing the torque from the electric motor torque reserve.

In some implementations, the HCP coordinating with the TCM to control the electric motor to provide torque to crank the engine includes providing the torque from the electric motor torque reserve while also the providing propulsive torque to the driveline.

In some implementations, the TCM coordinating control of the first and second clutches for shifting from the engine start gear to the target gear includes: ramping out the first clutch to decouple the first sub-transmission from the engine and ramping in the second clutch to couple the second sub-transmission in the target gear to the engine, wherein propulsive torque is provided by the engine and the electric motor through the target gear of second sub-transmission.

In some implementations, the HCP coordinates with the TCM to provide slip control to the first and second clutches during a period when the first and second clutches are each transferring engine torque to the respective first and second sub-transmissions.

In some implementations, the first and second clutches are configured to be controlled to couple/decouple the respective first and second sub-transmissions to/from the engine. In some implementations, the first and second synchronizers are configured to be controlled to couple/decouple the respective first and second sub-transmissions to/from the driveline. In some implementations, the hybrid electric vehicle is a mild hybrid electric vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, wherein:

FIGS. 3A-3C are a flow diagram of an example mild hybrid vehicle engine start system and method using one or more clutches of the hybrid transmission according to the principles of the present application.

DESCRIPTION

As previously discussed, conventional engine start types in hybrid electric vehicles can have hard limits on vehicle speed, transmission gear, etc. Moreover, in hybrid electric vehicles using a p1f motor as the starter, should the p1f motor become inoperable, this could prevent or abort an engine start.

Accordingly, improved engine start techniques are presented. These techniques improve the number of gears of the dual clutch transmission that are available for use with the P2 or P2.5 motor for the engine start, and improve the control strategy for engine start such that there are not hard limits on vehicle speed or transmission gear usage. Further, the limp home functionality is improved through utilizing vehicle inertia to improve drivability.

Figure 1:
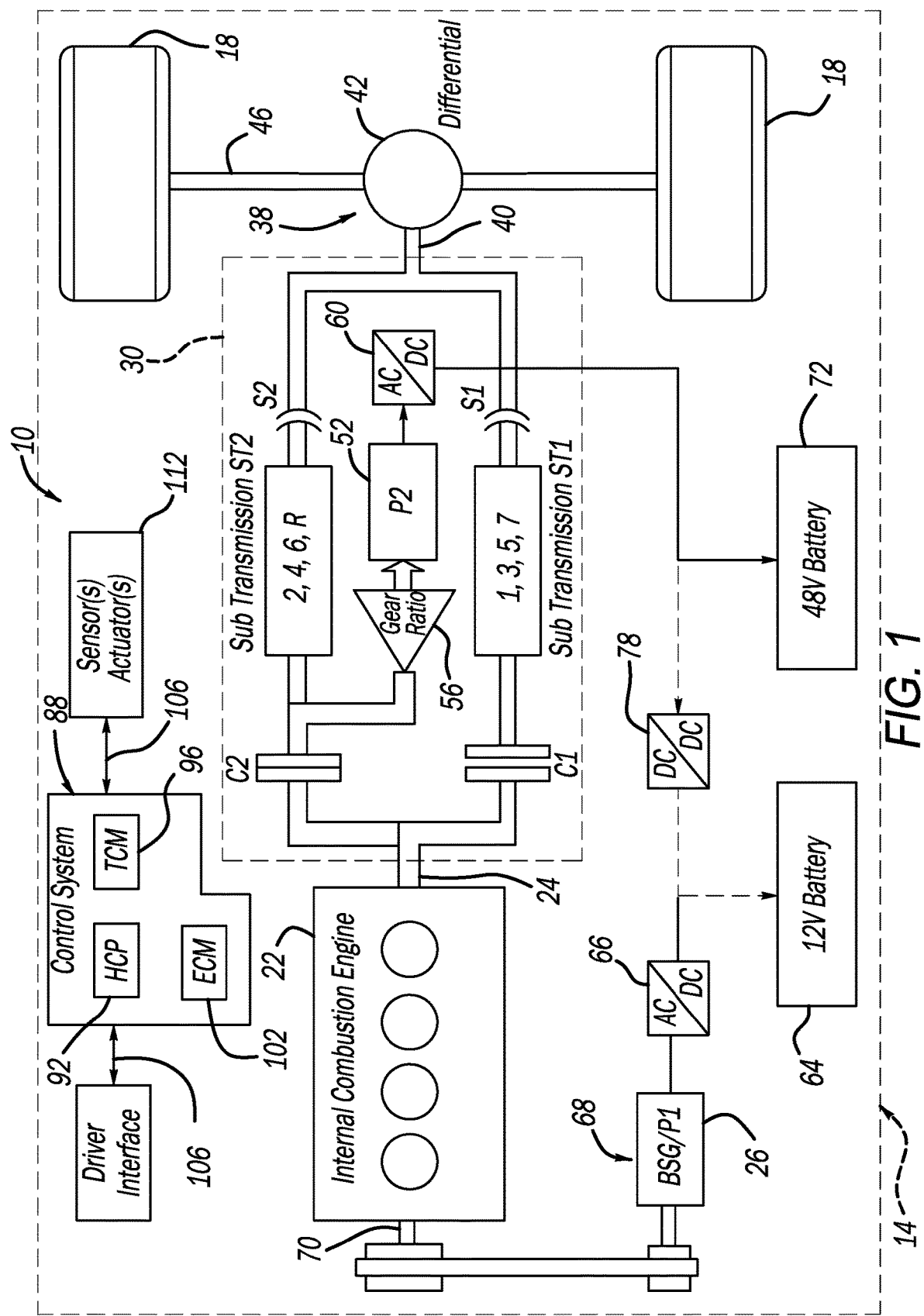
FIG. 1 illustrates an example schematic representation of a mild hybrid electric vehicle powertrain/driveline architecture including a hybrid dual clutch transmission according to the principles of the present application.
Figure 2A:
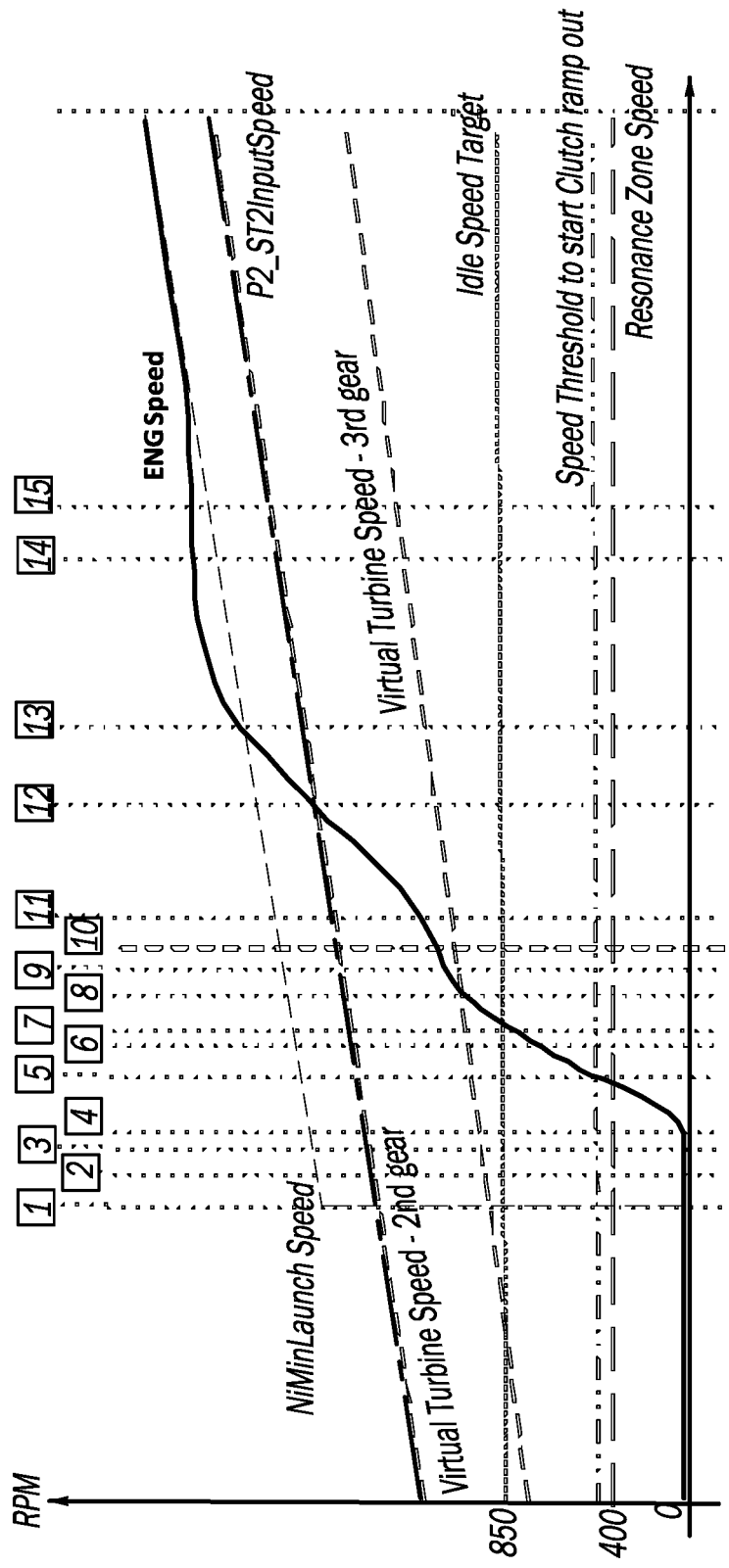
FIGS. 2A-2C illustrate an example use case showing example behavior of torques, speeds and interface across multiple controllers or a control system including a hybrid controller (HCP), a transmission controller (TCM) and an engine controller (ECM) according to the principles of the present application.
Figure 2B:
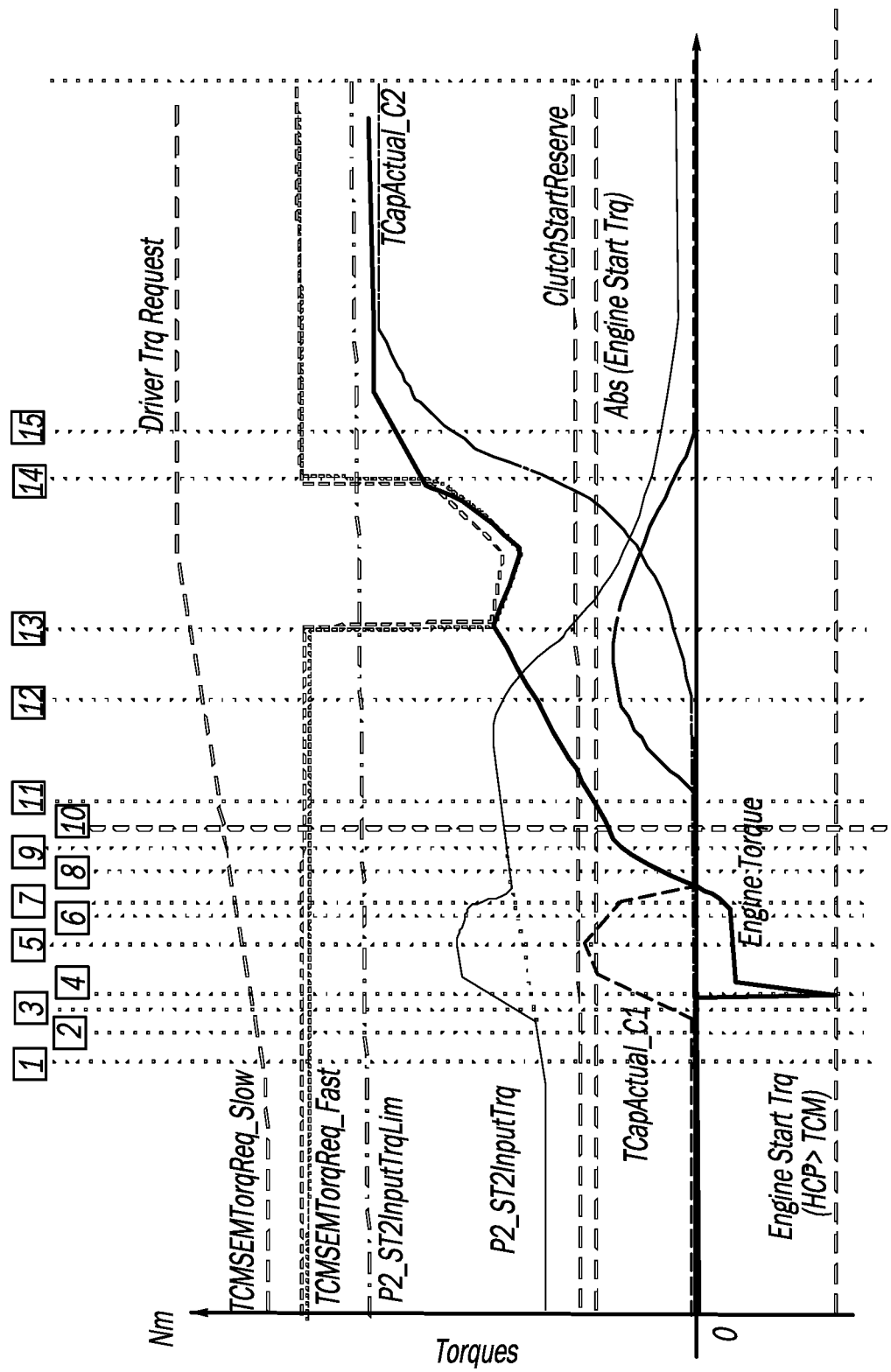
Figure 2C:
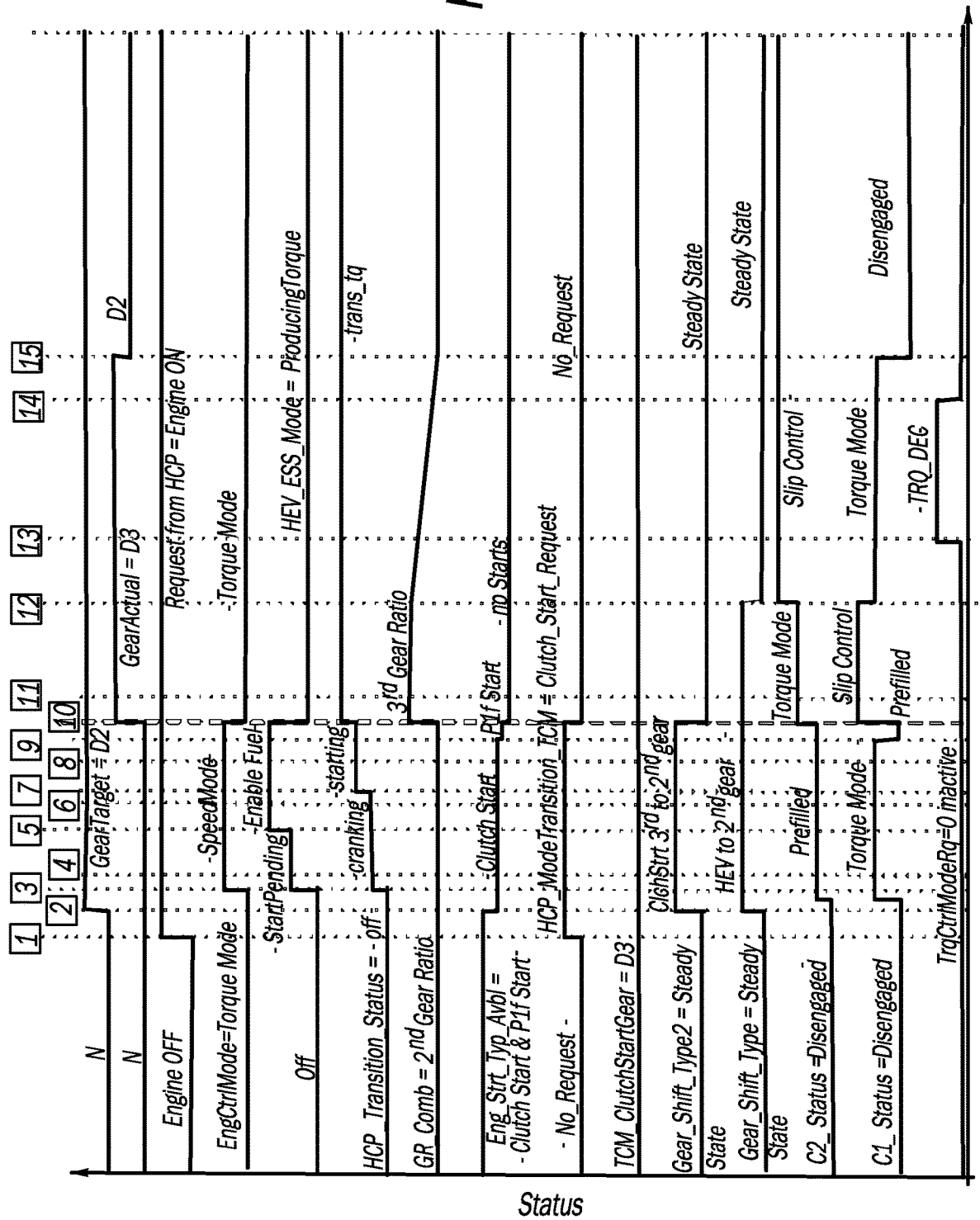

FIG. 1 illustrates an example mild hybrid powertrain architecture 10 for an example mild hybrid electric vehicle 14. It will be appreciated that while only two wheels 18 of the vehicle are illustrated, the vehicle 14 may 14 may include four or more wheels, as may be desired. In the example vehicle shown, the hybrid powertrain architecture 10 includes an engine 22, a first electric motor 26 rotationally coupled thereto, a hybrid dual clutch transmission 30 coupled to the engine 22 via an output and to a driveline system 38.

In the example architecture illustrated, the engine 22 may be an internal combustion engine 22 and may include four cylinders. It will be appreciated, however, that the engine 22 may include various configurations and number of cylinders, such as a v-type configuration and six or eight cylinders, for example. The driveline system 38 may include various components including, for example, a driveshaft 40 an electric drive module or differential 42, an axle 46 and the front wheels 18. While the example architecture illustrates the differential 42, it will be appreciated that other components, such as the electric drive module, may also be utilized.

The dual clutch hybrid transmission 30 includes, in general, dual clutches C1 and C2 associated with respective internal sub-transmissions ST1 and ST2. In the example illustrated, odd transmission gears are associated with sub-transmission ST1 and even gears are associated with sub-transmission ST2. Each sub-transmission ST1, ST2 also includes controllable synchronizers S1, S2 that include the capability to, among other things, couple and decouple the sub-transmissions ST1, ST2 from the driveline system 38. A P2 or P2.5 high voltage electric motor 52 is provided in or associated with the dual clutch transmission 30 and may be associated with a gear reducer 56 and an AC/DC converter 60.

The hybrid powertrain may be in the form of the mild hybrid electric vehicle powertrain discussed above and may include a low voltage battery or battery system 64, such as a 12V battery, which may be associated with a belt starter generator (BSG) unit 68. The BSG unit 68 includes the low voltage P1f motor 26 which is powered by the low voltage battery 64 through an AC/DC converter 66. The BSG unit 68 is coupled to the engine 22, typically via a crankshaft 70. The high voltage P2 motor 52 is electrically coupled to and powered by a high voltage battery or battery system 72 and is also electrically coupled to the AC/DC converter 60 and a DC/DC boost converter 78. In one example implementation, the DC/DC boost converter 78 is a unidirectional DC/DC converter and this together with the low voltage p1f motor 26 of the BSG unit 68 prevents the BSG unit 68 from being able to provide charging for the high voltage battery system 72.

The hybrid powertrain also includes a control system 88. In one example implementation, the control system 88 includes a hybrid controller or control unit (HCP) 92, a transmission controller or control unit (TCM) 96 and an engine controller or control unit (ECM) 102 in communication with the various components and systems of the hybrid vehicle powertrain 10 and each other via a communication network 106, such as CAN communication. In one exemplary implementation, the HCP 92 also functions or serves as a master controller over the other control units, including the TCM 96. The HCP 92 and TCM 96 may be collectively referred to herein individually or as the control system 88.

With reference to FIGS. 2A-2C and 3A-3C, example engine clutch start control techniques will now be discussed in greater detail. As an overview, the TCM 96 and the HCP 92 with each other to determine the availability and decision of each kind of potential engine start based on various conditions, and the HCP 92 commands the final engine start type. Of the controllers discussed herein, the HCP 92 is the supervisory or master controller. When an engine clutch start is selected and commanded, various possibilities exist depending on the current EV gear (gear connected to P2 Motor in the dual clutch transmission), preselected gear of sub-transmission ST1, gear used for starting the engine, and target gear. An optimized engine clutch start is done with all these variables being taken into account.

Continuing with the overview, the engine clutch start strategy can be divided into essentially three main phases: 1) triggering a start; 2) determining start type and confirming clutch start; and 3) clutch start execution. Each of these three main steps or phases are summarized in turn below, with further discussion thereafter with reference to the example use case of FIGS. 2A-2C and the example flow logic of FIGS. 3A-3C.

1) Triggering a Start

This phase or step essentially indicates when to perform the engine start. Usually during a clutch start, the P2 Motor satisfies a driver torque request via the sub-transmission ST2 and simultaneously delivers torque needed to crank the engine via the sub-transmission ST2 and clutch C2. The HCP 92 may determine whether there is enough reserve torque for the P2 motor 52 in order to execute an engine start while satisfying the driver torque request and decides when to start the engine. However, when there is any limp-home condition set, then the HCP can determine to execute a clutch start without fully compensating the driver torque request with the P2 motor resulting in a torque hole or reduction that may be noticeable to the driver. This kind of engine start may be referred to as a vehicle inertia start.

In general, the engine start/restart trigger happens when the requested driver torque is higher than a maximum P2 motor 52 torque minus the P2 motor 52 torque reserve. The HCP is programmed or configured to calculate or determine a maximum output torque allowed for EV driving based on the maximum P2 motor 52 torque and the P2 motor 52 torque reserve. In one example implementation, the HCP determines the torque reserve via a handshake from the TCM 96. The HCP 92 sends engine start torque information to the TCM 96 and the TCM 96 uses this information in addition to clutch losses, temperatures, etc., and sends back a determined total start torque to the HCP 92. The P2 motor 52 torque reserve is calculated via an optimization library, look-up table, ANN, etc. considering various inputs such as clutch status, temperature, shift type, total engine start torque, etc. from the TCM 96.

2) Determine Start Type as Clutch Start

New CAN 106 interfaces have been developed between the HCP 92 and the TCM 96 to exchange information between these controllers such as available start type from the TCM 96, clutch start gear from the TCM 96, start type request from the HCP 92, engine start stop mode & states from the HCP 92, and shift types etc. as described further in the use case discussed below. With these CAN interfaces, the HCP 92 can determine to trigger a clutch start of the engine 22 and confirms to the TCM 96 that the TCM 96 can go ahead and execute the engine clutch start strategy.

3) Clutch Start Execution

New CAN 106 interfaces have been developed such as start confirmation, shift types, etc. for successful initiation and execution of the clutch start strategy. In one exemplary implementation, the TCM 96 confirms the execution of the clutch start making sure all constraints of the system are not violated. The HCP 92 will delay the engine start request until confirmation from the TCM 96 has been sent, thus protecting other potentially limited life components in the hybrid powertrain architecture 10. The shift type signal sent by the TCM 96 is used for loading gear ratios for starting and supporting gears and calculating contribution by the P2 motor. The HCP 92 also utilizes unique control strategies for declaring engine running (delta speed integration checks, speed threshold checks etc.) and communicating this information via CAN 106 to the TCM 96.

With additional reference to FIGS. 2A-2C and FIGS. 3A-3C (which will hereinafter be referred to as, respectively, FIG. 2 and FIG. 3) and continuing reference to FIG. 1, the example use case and overview flow logic for the engine clutch start strategy using the P1fP2.5 vehicle 14 will now be discussed.

Figure 3A:
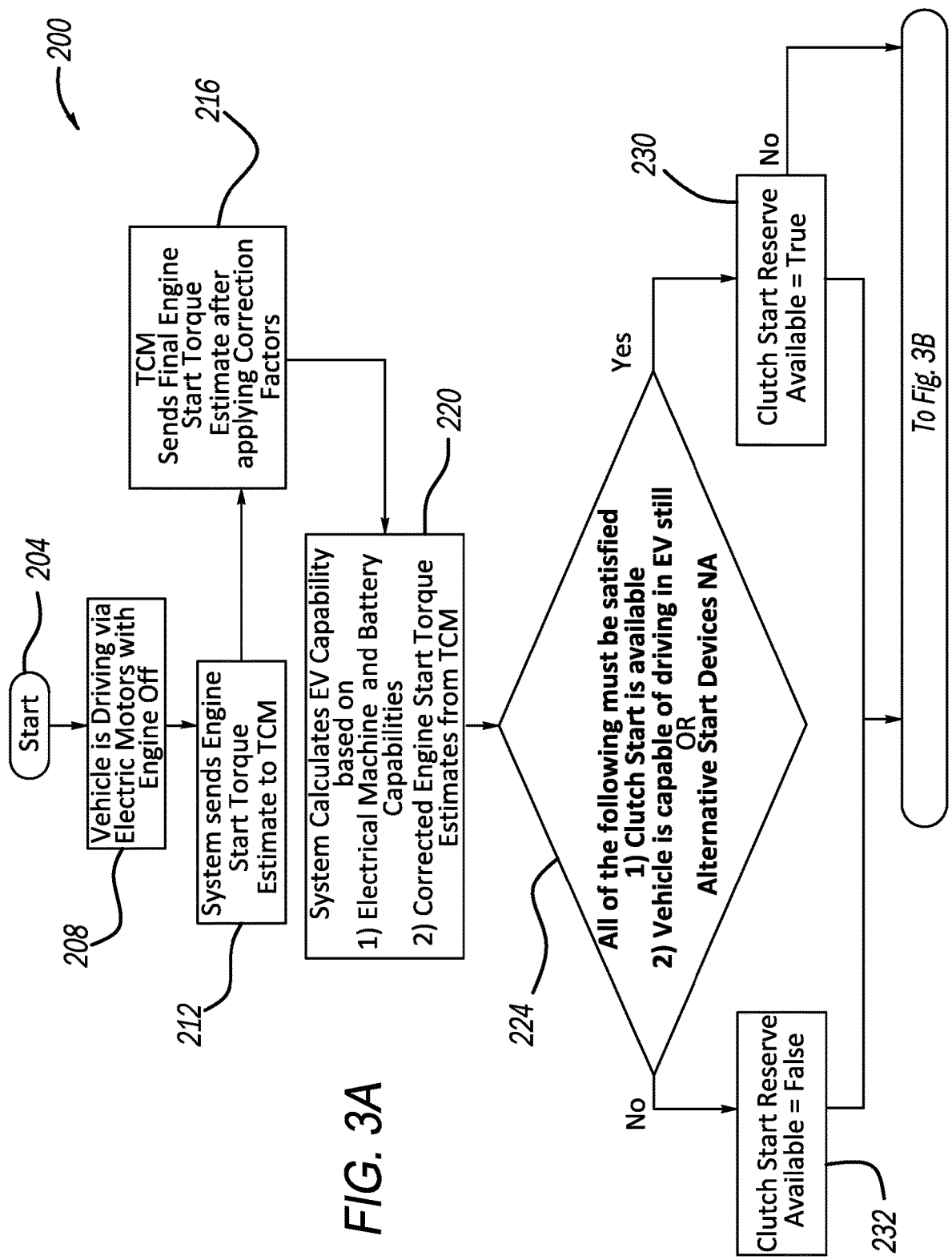
Figure 3B:
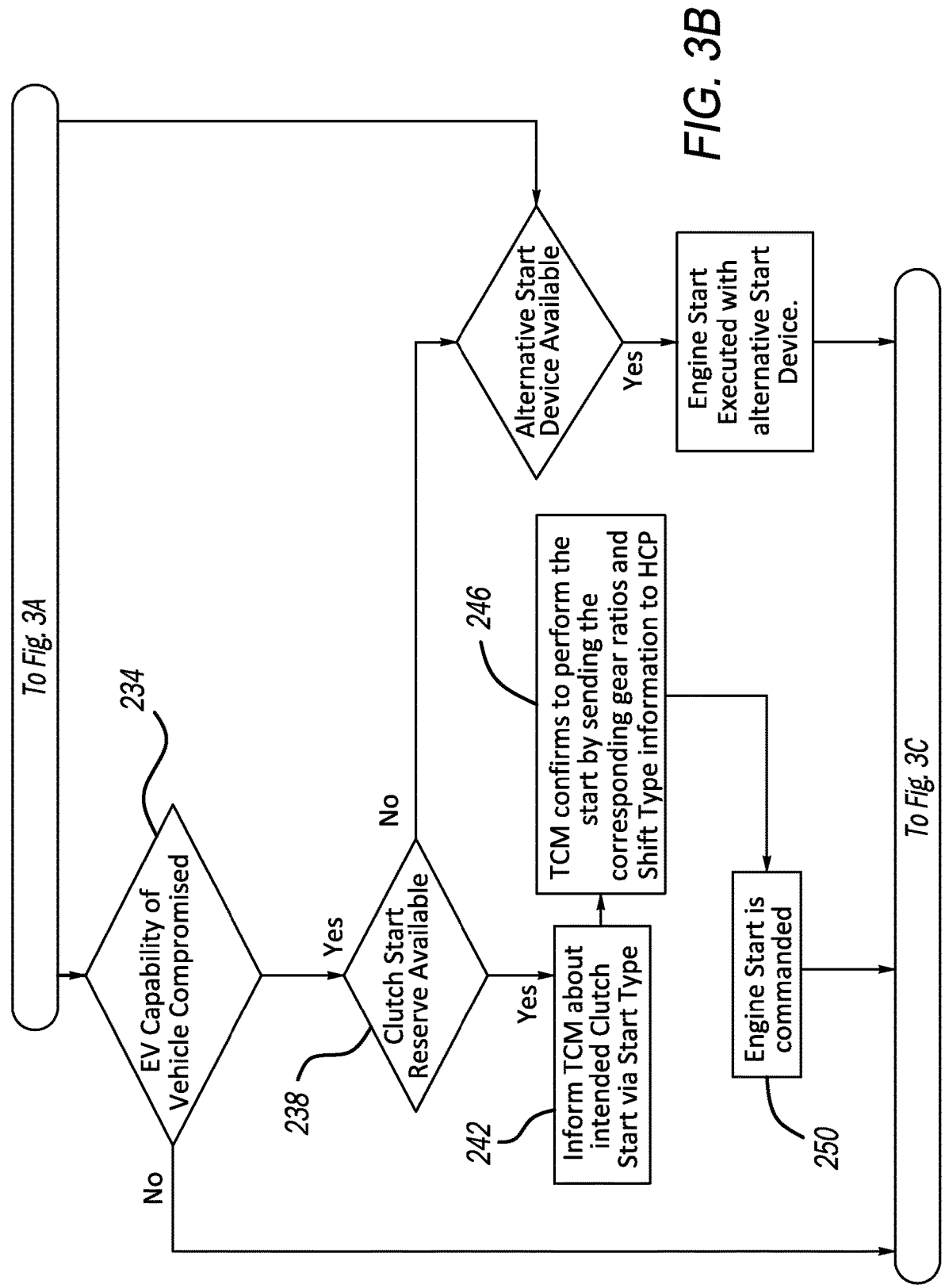

Starting with the higher level overview of the clutch start strategy 200 in FIGS. 3A-3C, the strategy or technique starts at block 204 and at block 208 initial or entry conditions of the vehicle being in an electric vehicle drive mode or EV mode and the engine being off are verified. At block 212, the control system 88 determines an engine 22 start torque estimate and communicates this to TCM 96. At block 216, the TCM 96 may then apply correction factors and sends a final engine start torque estimate to the control system 88. The control system 88 then calculates at block 220 an EV capability based on at least i) the capabilities of the motor 52 and battery system 72, and ii) the final engine start torque estimates from TCM 96.

The technique continues to decision block 224, where the following conditions need to be satisfied: i) determination that the clutch start strategy is available and ii) vehicle remains capable of being driven in EV mode while performing the clutch start strategy. This latter criterion essentially means that there is enough torque reserve available from motor 52 to perform the clutch start strategy while also maintaining the driver torque request with motor 52. If yes, at block 230, it is verified that the clutch start strategy motor torque reserve is available. Returning to block 224, when the criteria are not satisfied or true, the HCP 92 declares the clutch start reserve being not available or false at block 232 and the technique continues to block 234 discussed below. The techniques discussed above in connection with blocks 204-230 discussed above can be referred to generally as a clutch start reserve calculation sub-technique of the overall strategy or technique 200 or Phase 1 as summarized above.

At block 234 a determination is made as to whether or not the EV mode capability of the vehicle has been compromised. In other words, is the driver torque request not capable of being met by electric motor 52. If yes, at block 238, it is again verified that the electric motor 52 torque reserve needed to start the engine using the clutch start strategy remains available. If no, the HCP 92 determines there will not be an engine 52 start at block 240 and the technique ends at block 278.

If yes, at block 242 the HCP 92 communicates to the TCM 96 that the intended engine 22 start type will be the Clutch Start using a Start_Type communication signal. At block 246, the TCM acknowledges the Start_Type Clutch Start signal and confirms the clutch start will be performed by communicating corresponding gear ratios and Shift_Type information to the HCP 92. These Shift_Type signals include information regarding which sub-transmission will be used to start the engine and which gear, the currently engaged gear, and the target gear after the engine is started. More generally, the Shift_Type signals can be signals sent by TCM 96 to update HCP 92 with transitions taking place inside the sub-transmissions related to synchronizer and clutch positions for the prediction of torques and speeds.

In this use case, the TCM 96 communicates the Shift_Type signals indicating that sub-transmission ST1 together with gear 3 and clutch C1 will be used to start the engine 22, the $2^{nd}$ gear is the currently engaged on the other sub-transmission ST2, and that TCM 96 will engage $2^{nd}$ gear as the target gear after the engine 22 is started. At 250, the HCP 92 commends the engine to be started using the clutch start strategy. The techniques discussed above in connection with blocks 234-250 can be referred to generally as a Start_Type Handshake (with the TCM 96) sub-technique of the overall strategy or technique 200.

After block 250, the strategy or technique enters a Clutch Start Execution (Phase 3) portion or sub-technique of the overall technique 200. At block 254, the engine 52 starting process is monitored by the HCP 92. This can include checking parameters such as engine RPM, ECM 102 feedback and/or communications, clutch torque estimates for clutches C1, C2, etc. At block 258, the TCM 96 receives a cranking status as the transition status from engine off to engine on from the supervisory HCP 92.

At block 262, the HCP 92 confirms the engine 22 RPM is within the desired range, the clutch torque for clutches C1 and C2 are within a predetermined plausible range and when confirmed, coordinates commanding engine 22 fuel and firing. When false and the engine 22 does not start, the HCP 92 at block 282 declares an engine start failure and the strategy ends at block 278.

At 266 the HCP 92 detects and communicates the engine 22 is running and at block 270, the TCM 96 receives a signal from the HCP 92 indicative of the engine running and changes the transition status to Trans_Torque. The clutch start strategy then ends at block 278 with the engine 22 running and producing torque through transmission 30 to the front wheels 18.

With particular reference now to FIG. 2, the use case will now be discussed in greater detail. In this use case, example conditions, actions and system behaviors corresponding to certain line numbers in FIG. 2 are discussed below. This example use case explains behavior of torques, speeds and statuses across or among various components including the HCP 92, the TCM 96 and the ECM 102 and essentially focuses on Phase 3—Clutch Start Execution. This example use case is based on the vehicle 14 being in an electric vehicle or EV mode (engine off), the dual clutch transmission 30 gear or EV gear currently engaged being gear 2, the preselected gear in sub-transmission ST1 is gear 3, the clutch start gear is gear 3, and the target gear is gear 2. It should be appreciate that other gear variations are of course contemplated and the below use case is not to be construed as limiting.

The following control signals are referenced in FIG. 2 for this example transition use case.
HCP_Transition_Status=signal from HCP 92 indicating internal start phase (on CAN 106)
Eng_Strt_Typ_Avbl=Available Start Type from TCM 96 (on CAN 106)
HCP_ModeTransition_TCM=Start Type Request from HCP 92 (on CAN 106)
TCM_ClutchStartGear=Clutch Start Gear from TCM 96 (on CAN 106)
GR_Comb=Active EV or Hybrid Gear Ratio (on CAN 106)
HEV_ESS_Mode=Engine Start Stop mode from HCP 92 (on CAN 106)
Gear_Shft_Type1,2=Signals sent by TCM 96 to update HCP 92 with the transitions taking place inside the sub-transmission related to synchronizer and clutch positions for the prediction of torques and speeds (on CAN 106)
EngCtrlMode=Engine control mode from HCP 92 (on CAN 106)
TCapActual_C1=C1 Clutch Capacity from TCM 96 (on CAN 106)
TCapActual_C2=C2 Clutch Capacity from TCM 96 (on CAN 106)
P2_ST2InputTrq=P2 Motor 52 Torque in sub-transmission ST2 shaft Input domain (on CAN 106)
P2_ST2InputSpeed=P2 Motor 52 Speed in sub-transmission ST2 shaft Input domain (on CAN 106)
NiMinLaunchSpeed=Launch Speed Target from HCP 92 (on CAN 106)
TrqCtrlModeRq=Intervention Request type from TCM 96 (on CAN 106)
TCMSEMTorqReq_Slow, TCMSEMTorqReq_Fast=Slow and Fast path intervention torques from TCM 96 (on CAN 106)

Line 1

The TCM 96 sends Eng_Strt_Typ_Avbl as "Clutch Start & P1f Start", indicating that the TCM 96 is able to execute the clutch start strategy (i.e., Phase 3). The HCP 92 requests the engine 22 to be started. The HCP 92 determines the engine 22 start type as "Clutch_Start" and sends this information to TCM 96, requesting the TCM 96 to use the clutch-start method.

Line 2

Using unique Shift_Type signals, the TCM 96 indicates that the odd clutch (gear3) of sub-transmission ST1 will be used to start the engine 22, the $2^{nd}$ gear is engaged on the other sub-transmission ST2 and that TCM 96 will engage $2^{nd}$ gear as target gear after the engine 22 is started. The TCM 96 sets Target Gear to "D2", to indicate the target gear after the engine 22 is started. The TCM 96 sets clutch C2_Status to "Prefilled" as the clutch C2 clutch is prefilled but will not be used as the starting clutch/device. The TCM 96 applies clutch C1, and as the clutch is prefilled, and the C1_Status changes to "Torque Mode". Here, there will be a torque loss as clutch C1 is ramped up to engage engine 22 with sub-transmission ST1, so the HCP 92 compensates the C1 clutch torque with extra torque from the P2 motor 52 (P2_ST2InputTrq).

Line 3

At this point in the strategy, the engine 22 is rotating and the HCP 92 changes the HCP_Transition_Status to "cranking". The HCP 92 also changes HEV_ESS_Mode to "StartPending" and EngCtrlMode to "Speed Mode".

Line 5

With the engine 22 rotating speed now reaching a TCM 96 internal speed threshold, the TCM 96 ramps out the clutch C1 torque. The HCP 92 changes the HEV_ESS_Mode to "EnableFuel" to being the engine 22 starting is in process.

Line 7

The HCP 92 changes "HCP_Transition_Status" to "starting".

Line 9

The engine 22 is now started, the clutch C1 torque is ramped out and the clutch C1_Status changes from "Torque Mode" back to "Prefilled".

Line 10

The HCP 92 detects the engine 22 to be running, and the HCP_Transition_Status changes to "trans_tq". The TCM 96 receives the change in HCP_Transition_Status and updates Gear_Shft_Type2 to "Steady State". The TCM 96 sets Gear Pos Actual to "D3" and GR_Comb to "$3^{rd}$ Gear Ratio". The TCM 96 sets C2_Status to "Torque Mode" and C1_Status to "Slip Control". The TCM 96 sets Eng_Strt_Typ_Avbl to "No Starts". The HCP 92 changes HEV_ESS_Mode to "ProducingTorque".

Line 11

The TCM 96 applies C1 clutch, as the engine 22 speed is above the $3^{rd}$ gear turbine speed. The TCM 96 aims to control the engine 22 speed to NiMinLaunchSpeed.

Line 12

The TCM 96 applies C2 clutch, as the engine 22 speed is above the $2^{nd}$ gear turbine speed, likewise the C1 clutch torque is reduced. The TCM 96 sets C1_Status to "Torque Mode" and C2_Status to "Slip Control". The TCM 96 sets GR_Comb to reflect the torque ratio between the C1 and C2 clutch. The TCM 96 changes Gear_Shft_Type to "Steady State".

Line 13

Here, the TCM 96 reduces the engine 22 torque via TrqCtrlModeRq="TRQ_DEC" and TCMSEMTorqReq_Slow and TCMSEMTorqReq_Fast, as the engine 22 speed is crossed the desired speed of NiMinLaunchSpeed. This is to address a scenario where there is a speed overshoot.

Line 14

Here the TCM 96 stops the engine 22 torque reduction (to address the overshoot scenario), as the engine 22 speed can be controlled via the C1 and C2 torques. TrqCtrlModeRq changes to "Inactive" and TCMSEMTorqReq_Slow change to "Inactive" as well.

Line 15

The C1 clutch torque is fully ramped out. The TCM 96 sets GR_Comb equal to "$2^{nd}$ Gear ratio". The TCM 96 sets C1_Status to "Disengaged". The TCM 96 continues to apply the C2 clutch torque, targeting the engine 22 speed to be NiMinLaunchSpeed.

In summary, for a hybrid vehicle powertrain architecture having the availability and capability of a dual clutch hybrid transmission including two transmission clutches along with an electric traction motor, unique and improved control strategies were developed for a unique engine clutch start strategy. Additionally, vehicle inertia was utilized in limp-home situations to maximize drivability. With this strategy, complex engine clutch start execution was optimized and EV driving capabilities were also maximized. With this engine clutch start strategy, the P2 motor can be used to start in more possible transmission gears. A shift type interface was developed to keep track of different gears and load gear ratios. The hybrid controller's clutch start strategy doesn't have hard limits on vehicle speed and transmission gear, and uses full hardware capability of the system.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid electric vehicle, comprising:
   a dual clutch transmission having first and second sub-transmissions having respective first and second clutches and first and second synchronizers, and an electric motor rotationally coupled to the second sub-transmission for common rotation therewith;
   a control system including at least a hybrid control unit (HCP) and a transmission control unit (TCM), wherein the HCP functions as a supervisory controller, and wherein the control system is configured to execute an engine clutch start procedure, including:
   with the vehicle in an electric only propulsion mode where the second clutch is disengaged and the electric motor provides propulsive torque to a driveline of the vehicle via the second sub-transmission, determining that a driver torque request received is greater than a maximum torque of the electric motor minus a torque reserve of the electric motor;
   the HCP coordinating with the TCM to determine an engine start torque required to start the engine, and determining the electric motor torque reserve is greater than the engine start torque required to start the engine;
   the HCP coordinating with the TCM via shift-type signals to establish an engine start gear of the first sub-transmission, and a target gear to be engaged after the engine is started;
   the TCM applying the first clutch thereby coupling the engine with the first sub-transmission with the engine start gear engaged;
   the HCP coordinating with the TCM to control the electric motor to provide torque to crank the engine to a threshold rotating speed sufficient for starting the engine and thereafter coordinating starting of the engine; and
   the TCM coordinating control of the first and second clutches for shifting from the engine start gear to the target gear, wherein propulsive torque is then provided by the engine and the electric motor through the target gear of second sub-transmission.

2. The hybrid vehicle of claim 1, wherein after the TCM applies the first clutch, the HCP coordinates with the TCM to command additional torque from the electric motor to compensate for torque loss from engagement of the first clutch.

3. The hybrid vehicle of claim 1, wherein the HCP coordinating with the TCM via shift-type signals incudes the HCP informing the TCM of the upcoming clutch start and the TCM confirming the upcoming clutch start by responding with shift-type signals specifying the engine start gear and the target gear.

4. The hybrid vehicle of claim 1, further comprising the TCM responding with shift-type signals specifying a currently engaged gear of the second sub-transmission.

5. The hybrid vehicle of claim 1, wherein the HCP coordinating with the TCM to control the electric motor to provide torque to crank the engine includes providing the torque from the electric motor torque reserve.

6. The hybrid vehicle of claim 1, wherein the HCP coordinating with the TCM to control the electric motor to provide torque to crank the engine includes providing the torque from the electric motor torque reserve while also the providing propulsive torque to the driveline.

7. The hybrid vehicle of claim 1, wherein the TCM coordinating control of the first and second clutches for shifting from the engine start gear to the target gear includes:
   ramping out the first clutch to decouple the first sub-transmission from the engine and ramping in the second clutch to couple the second sub-transmission in the target gear to the engine,
   wherein propulsive torque is provided by the engine and the electric motor through the target gear of second sub-transmission.

8. The hybrid vehicle of claim 7, further comprising the HCP coordinating with the TCM to provide slip control to the first and second clutches during a period when the first and second clutches are each transferring engine torque to the respective first and second sub-transmissions.

9. The hybrid vehicle of claim 1, wherein the first and second clutches are configured to be controlled to couple/decouple the respective first and second sub-transmissions to/from the engine.

10. The hybrid vehicle of claim 1, wherein the first and second synchronizers are configured to be controlled to couple/decouple the respective first and second sub-transmissions to/from the driveline.

11. The hybrid vehicle of claim 1, wherein the hybrid electric vehicle is a mild hybrid electric vehicle.

* * * * *